United States Patent [19]

Nisley

[11] Patent Number: 5,791,787
[45] Date of Patent: Aug. 11, 1998

[54] CORROSIVE RESISTANT BEARING ASSEMBLY

[75] Inventor: Donald L. Nisley, Greenville, S.C.

[73] Assignee: Reliance Electric Industrial Company, Cleveland, Ohio

[21] Appl. No.: 802,154

[22] Filed: Feb. 19, 1997

[51] Int. Cl.$^6$ ..................................................... F16C 19/52
[52] U.S. Cl. .......................... 384/498; 384/537; 384/902; 384/912
[58] Field of Search .................... 384/498, 558, 384/912, 902, 537, 206

[56] References Cited

U.S. PATENT DOCUMENTS

| | | |
|---|---|---|
| 2,669,491 | 2/1954 | Haller . |
| 2,812,224 | 11/1957 | Richmond . |
| 3,188,154 | 6/1965 | Firth . |
| 3,339,991 | 9/1967 | Howe, Jr. . |
| 3,365,253 | 1/1968 | Haller . |
| 3,782,794 | 1/1974 | Chmura et al. . |
| 4,094,559 | 6/1978 | Slusarski . |
| 4,776,709 | 10/1988 | Tooley . |
| 4,973,172 | 11/1990 | Nisley et al. . |

FOREIGN PATENT DOCUMENTS 2033084  1/1971  Germany .

OTHER PUBLICATIONS

Resinol RTC Porosity Sealant brouchure; Lucite Corp.; Jan. 10, 1994.
EDT Stainless Steel Bearing Housings brouchure, pp. E-1-E12; EDT Corporation, Vancouver, Washington (no date).

Primary Examiner—Lenard A. Footland
Attorney, Agent, or Firm—Timothy A. Cassidy; John M. Miller; John J. Horn

[57] ABSTRACT

The present invention is generally directed to a bearing assembly suitable for use in a wet or harsh chemical environment. The bearing assembly includes a bearing housing that is resistant to corrosion, oxidation, contamination and deterioration when exposed to water, bacteria and various chemicals. Specifically, the bearing housing in accordance with the present invention is made from sintered stainless steel. In one embodiment, the housing can also be impregnated with a polymeric sealant which prevents the housing from entrapping bacteria and chemicals to which it may be exposed.

14 Claims, 3 Drawing Sheets

5,791,787

CORROSIVE RESISTANT BEARING ASSEMBLY

FIELD OF THE INVENTION

The present invention is generally directed to corrosive resistant bearings. More particularly, the present invention is directed to bearing assemblies particularly well suited for use in a wet or harsh chemical environment that have housing made from a resin impregnated sintered stainless steel.

BACKGROUND OF THE INVENTION

In the food and chemical industries, bearing assemblies must be capable of supporting rotating shafts and other structures in harsh chemical environments and in wet operating environments. The bearing assemblies must be capable of functioning properly in such environments without corroding, rusting, malfunctioning, or otherwise deteriorating. The bearing assemblies should be resistant to attack by chemicals to which they are to be exposed, and particularly in the food industry, not promote bacterial growth that may contaminate the food products being processed. In the past, a number of attempts have been made to create a corrosive resistant bearing assembly.

For instance, in the past, bearing assemblies have included a metal housing covered with an anti-corrosive coating. Such coatings have included, for instance, nickel, nylon, TEFLON™, chrome, and even paints. It has been discovered, however, that the above coating materials can become damaged and chipped over time. Once damaged, chemicals, water, and other corrosive agents can penetrate the coatings and attack and deteriorate the underlying metal housing.

One particular coated bearing housing that proved to be successful in withstanding harsh environments is disclosed in U.S. Pat. No. 4,973,172 by Nisley, et al entitled "Coated Products For Use In Harsh Environs," which is incorporated herein by reference in its entirety. In Nisley, et al, a bearing housing is disclosed that is coated with layers of tough, durable fluorocarbon polymers that render the housing resistant to corrosion or chemical attack. In one embodiment, the housing is coated with a first polymer that exhibits thermoset characteristics for bonding to the housing. A second polymer is then applied and bonded to the first polymer. Nisley, et al offers great advancements in coated bearing housings. A need remains, however, for a non-coated bearing assembly that is also resistant to corrosion.

In this regard, bearing housings made entirely of a polymeric material have also been proposed in the past. Polymer housings, however, do not exhibit the same strength and the same mechanical properties as metal housings. Further, some properties and characteristics of polymer housings can deteriorate after repeated exposure to various chemicals.

Anti-corrosive bearing assemblings have also been made in the past including a cast stainless steel housing. Stainless steel is not only an excellent material for use in bearing assemblies, but is also particularly well adapted to resisting corrosion, oxidation, and all forms of chemical attack. Unfortunately, cast stainless steel parts are very expensive making their use in some applications cost prohibitive.

Another disadvantage to using cast stainless steel housings is that the housings after being formed must be machined to the desired shape. Machining cast stainless steel parts is difficult, time consuming and further adds to the cost of the bearing assembly. For instance, presently, a cast stainless steel bearing housing must undergo at least four machining operations before it can be combined with a ball bearing assembly. Specifically, a standard cast housing, prior to use, must have the mounting surface milled, the mounting holes drilled, the lube holes drilled and tapped, and the housing bore must be machined straight and then sphere bored to accept a ball bearing insert.

In view of the above deficiencies, a need exists for a bearing assembly that is resistant to corrosion, contamination and deterioration when exposed to harsh chemicals, bacteria, and other corrosive agents. A need also exists for a bearing assembly suitable for use in a wet or harsh chemical environment that is made from a non-corrosive metal. A need further exists for a suitable replacement to bearing assemblies made with cast stainless steel housings that is less expensive to produce and does not require substantial machining operations prior to use.

SUMMARY OF THE INVENTION

The present invention recognizes and addresses the foregoing disadvantages, and others of prior art constructions and methods.

Accordingly, it is an object of the present invention to provide an improved bearing assembly particularly well suited for use in a wet or harsh chemical environment.

It is another object of the present invention to provide a bearing assembly having a housing made from a non-corrosive metal.

Another object of the present invention is to provide a corrosive resistant bearing assembly that is less expensive to manufacture than bearing assemblies made with cast stainless steel housings.

Still another object of the present invention is to provide a bearing assembly having a bearing housing made from a non-corrosive metal that does not require a significant amount of machining.

It is another object of the present invention to provide a bearing assembly having a corrosive resistant bearing housing that holds its size and maintains a desired swivel torque.

Another object of the present invention is to provide a bearing assembly having a corrosive resistant housing made from sintered stainless steel.

Still another object of the present invention is to provide a bearing assembly having a corrosive resistant housing made from sintered stainless steel that has been impregnated with a polymer resin.

These and other objects of the present invention are achieved by providing a bearing assembly suitable for use in a wet or harsh chemical environment. The bearing assembly includes an anti-corrosive bearing housing defining a circular bore therethrough. The circular bore has an inner curved surface. The bearing housing also includes at least one mounting member for securing the housing to an adjacent structure.

A bearing insert is received within the circular bore of the bearing housing. The bearing insert defines a spherical surface for mating with the inner curved surface of the circular bore. The bearing insert defines an inner bore for supporting a rotatable shaft.

In accordance with the present invention, the bearing housing is made from sintered stainless steel, which is resistant to corrosion and chemical attack. The stainless steel used to construct the bearing housing can be an austenitic grade or a martensitic grade of stainless steel. The stainless steel can contain from about 11 percent to about 20 percent by weight chromium. Particular grades of stainless steel well suited for use in the present invention include stainless steels having an alloy designation number of 303, 304, 316 and 410.

In one embodiment, the sintered stainless steel bearing housing can be impregnated with a sealant. The sealant can be used to fill any pores found within the housing for protecting the housing and generally preventing any chemicals, bacteria or other liquids from contaminating the housing. In one embodiment, the sealant can be a thermoset polymer, such as a blend of methacrylate monomers.

These and other objects of the present invention are also achieved by providing a method of making a bearing assembly suitable for use in a wet or harsh chemical environment. The method includes the steps of compressing a stainless steel powder into the shape of a bearing housing. The bearing housing includes a circular bore therethrough and has at least one mounting member for securing the housing to an adjacent structure.

Once formed, the bearing housing is then heated to a temperature sufficient to cause the metal powder to sinter, but at a temperature insufficient to melt the metal powder. During the sintering process, pores may form in the housing. In order to seal the housing, a polymeric material, such as a thermoset polymer, can be applied to the bearing housing. The polymeric material impregnates and seals any pores contained in the housing.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
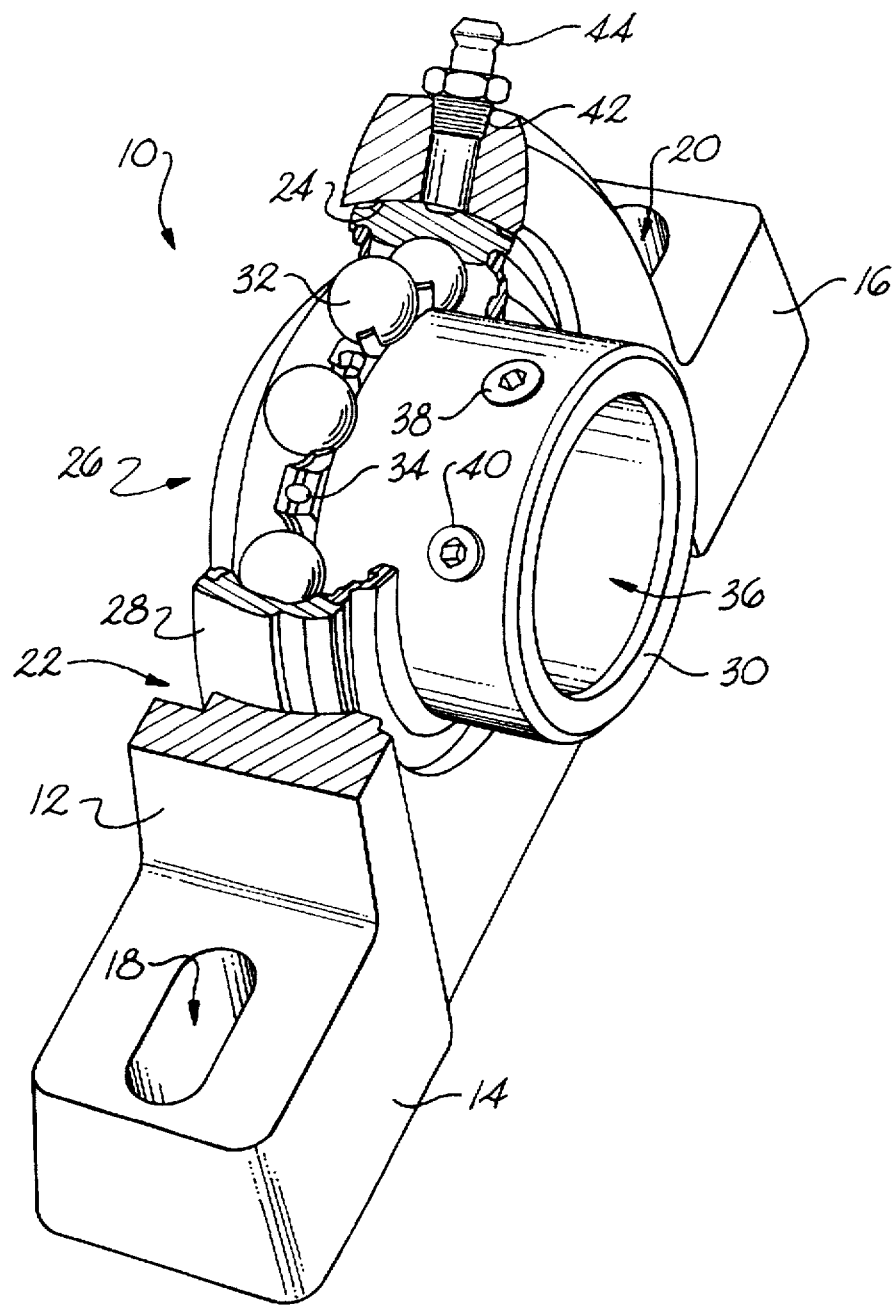
FIG. 1 is a perspective view with cutaway portions of a bearing assembly made in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention which broader aspects are embodied in the exemplary construction.

In general, the present invention is directed to bearing assemblies particularly well suited for use in wet and harsh chemical environments. To protect the bearing assembly from corrosion, oxidation, contamination or any other similar type of deterioration, the bearing assembly includes a housing made from sintered stainless steel. A sintered stainless steel housing is, as used herein, a housing that is made by heating compressed metal powders without melting the metal. In one embodiment, after being formed, the sintered stainless steel housing is impregnated with a polymeric material. As will be described in more detail hereinafter, the use of sintered stainless steel in bearing assemblies offers many benefits and advantages not before realized by prior art constructions and methods.

Without limitation, all types of bearing assemblies can be made in accordance with the present invention. For instance, the present invention is directed to pillow block bearings, flange bearings, take-up bearings, hanger bearings, cylindrical units and the like. Further, the bearing assemblies can be constructed with ball bearings, roller bearings, cylindrical polymer inserts or any other suitable type of bearing mechanism.

Figure 2:
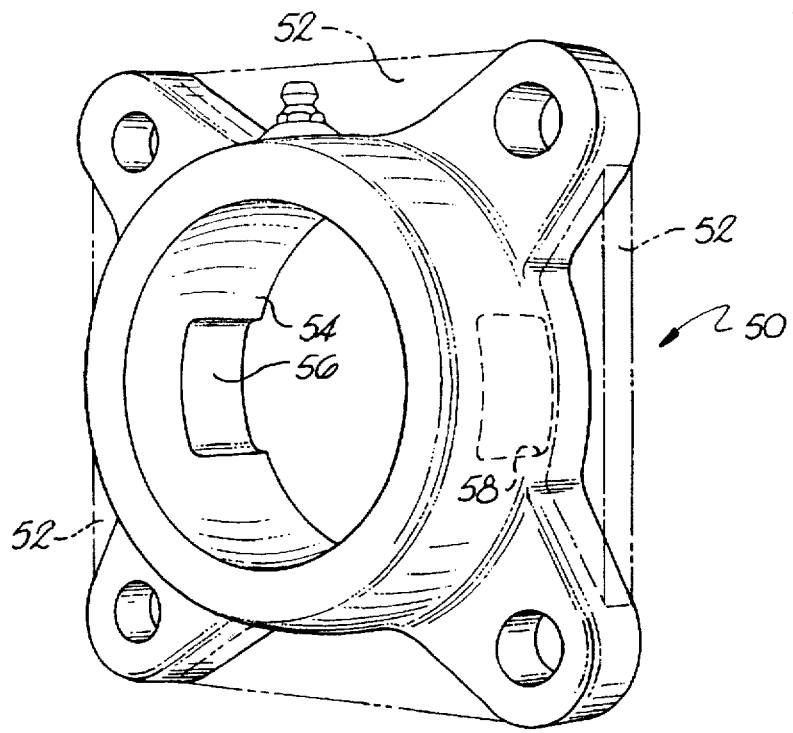
FIG. 2 is a perspective view of a flange bearing housing made in accordance with the present invention.
Figure 4:
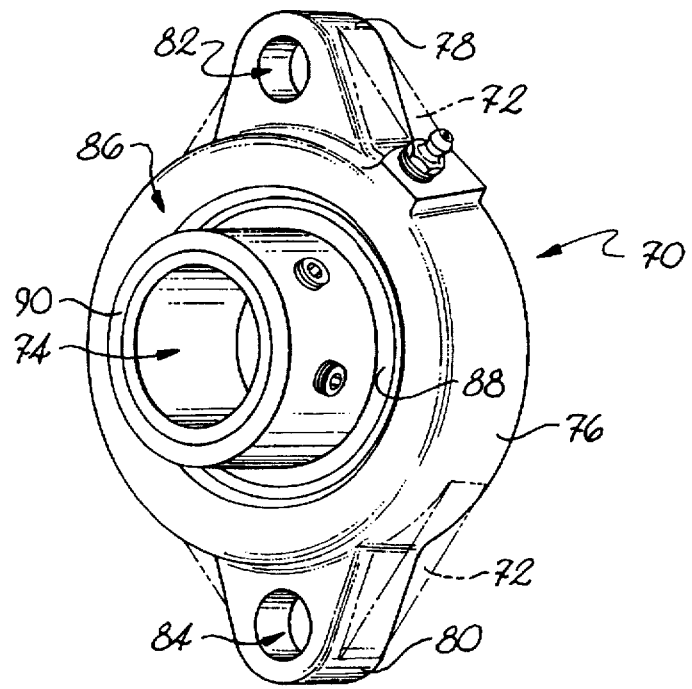
FIG. 4 is a perspective view of another embodiment of a flange bearing assembly made in accordance with the present invention.

Referring to FIGS. 1, 2 and 4, for exemplary purposes only, a pillow block bearing assembly generally 10, one embodiment of a flange-type bearing housing generally 50, and a second embodiment of a flange bearing assembly generally 70 made in accordance with the present invention are illustrated. In conventional bearing assemblies, a bearing insert made from a polymer sleeve or containing rollers or ball bearings is seated in a circular bore formed in the bearing housing. The bore can have a spherical or cylindrical shape. In one embodiment, the bearing insert is self aligning during initial installation and throughout the normal operating life of the pillow block.

More particularly, as shown in FIG. 1, pillow block bearing assembly 10 includes a bearing housing 12 having a pair of opposing bases 14 and 16 which define respective slots 18 and 20. Slots 18 and 20 are adapted to receive an attachment device, such as a bolt, for securing bearing assembly 10 to a supporting surface.

Bearing housing 12 also includes a circular bore 22 having an inner curved surface 24, which in this embodiment is concave with respect to the outer dimensions of the circular bore. A bearing insert generally 26 is received within circular bore 22. Bearing insert 26 has a spherical outer shape which mates with inner curved surface 24. Bearing insert 26, which may be considered as conventional, includes an outer race 28, an inner race 30, and a row of ball bearings, roller bearings, or the like 32. Ball bearings 32 are held in place between outer race 28 and inner race 30 by a cage 34.

Bearing assembly 10 is adapted to receive a shaft through an inner bore 36 defined by inner race 30. A shaft normally extends completely through the inner race and projects outwardly from the ends thereof. Inner race 36 is retained firmly in place on the shaft by a plurality of set screws 38 and 40. The use of set screws, however, represents merely one manner for securing a shaft to the bearing assembly. The application of a given swivel torque to a shaft installed in bearing assembly 10 moves bearing insert 26 a predetermined amount about the circular bore 22.

In one embodiment, bearing assembly 10 can include a means for lubricating bearing insert 26 during operation. For instance, bearing housing 12 can define a threaded bore 42 for receiving a lubrication fitting 44. Lubrication fitting 44 is adapted to be connected to a conduit for supplying lubricant to bearing assembly 10.

In accordance with the present invention, bearing housing 12 of bearing assembly 10 is made from sintered stainless steel. It has been discovered that bearing housings made from sintered stainless steel are less expensive to produce than housings made from cast stainless steel, but still provide all of the advantages of using stainless steel in bearing assemblies. In general, a stainless steel refers to a steel that contains alloy additions that make the material corrosive resistant. For instance, stainless steels are more resistant to corrosion, rusting, and oxidation than other metals due primarily to the presence of chromium addition. In general, stainless steel can contain from about 4 percent by weight chromium to about 30 percent by weight chromium.

Bearing housings made in accordance with the present invention preferably contain from about 11 percent chromium to about 20 percent chromium. Either austenitic stainless steels or martensitic stainless steels (which are generally harder and less ductile than austenitic stainless steels) can be used. Particular stainless steels well suited for use in the present invention include those stainless steels that have alloy designation numbers 303, 304, 316, and 410. Alloy designation numbers are convenient but arbitrary listings of various grades of stainless steels. The actual composition of 303, 304, 316 and 410 stainless steels are as follows:

assembly. In sintered stainless steel housings made according to the present invention, on the other hand, the sphere bore and the lube hole drilling and tapping procedures are the only machining operations that are required.

The near-net shape housing design of sintered bearing housings also reduces and minimizes the amount of material needed to make the housing without compromising any strength properties. For instance, as shown in FIGS. 2 and 4, flange bearing housing 50 includes web portions 52 drawn in phantom while flange bearing assembly 70 includes web portions 72 also drawn in phantom. In conventional cast metal housings, web portions 52 and 72 were required to be added to the final shape. Web portions 52 and 72, however, can be eliminated according to the present invention when the bearing housings are made from sintered stainless steel due to the greater control that is afforded during the molding process of the metal part.

Flange bearing housing 50 and flange bearing assembly 70 are constructed and assembled similar to pillow block bearing assembly 10 illustrated in FIG. 1. For instance, as

TABLE I

| Alloy Designation | Chemical Composition, % | | | | | | | | | |
|---|---|---|---|---|---|---|---|---|---|---|
| | Fe | Cr | Ni | Mn | Si | S | C | P | Mo | N |
| SS-303 | rem. | 17.0 | 8.0 | 0.0 | 0.0 | 0.15 | 0.0 | 0.0 | — | — Minimum |
| | rem. | 19.0 | 13.0 | 2.0 | 1.0 | 0.30 | 0.03 | 0.20 | — | — Maximum |
| SS-304 | rem. | 18.0 | 8.0 | 0.0 | 0.0 | 0.0 | 0.0 | 0.0 | — | — Minimum |
| | rem. | 20.0 | 12.0 | 2.0 | 1.0 | 0.03 | 0.03 | 0.045 | — | — Maximum |
| SS-316 | rem. | 16.0 | 10.0 | 0.0 | 0.0 | 0.0 | 0.0 | 0.0 | 2.0 | — Minimum |
| | rem. | 18.0 | 14.0 | 2.0 | 1.0 | 0.03 | 0.03 | 0.045 | 3.0 | — Maximum |
| SS-410 | rem. | 11.5 | — | 0.0 | 0.0 | 0.0 | 0.0 | 0.0 | — | 0.2 Minimum |
| | rem. | 13.5 | — | 1.0 | 1.0 | 0.03 | 0.25 | 0.04 | — | 0.6 Maximum |

As opposed to other metals, stainless steel offers many advantages, especially when used in wet or harsh chemical environments. For instance, stainless steel is much more corrosive resistant than most metals. The mechanical properties of stainless steel are also well suited for use in bearing assemblies. For example, stainless steels are stronger, have greater elongation, and are more ductile than many other metals, such as for instance, cast iron and sintered steel. By having greater ductility, stainless steels are better suited to recover from shock loads. In particular, because the material is ductile, stress fractures will not propagate through the metal.

As briefly mentioned above, sintered stainless steel housings are made by compressing and heating metal powders. Specifically, the procedure involved in producing sintered stainless steel housings is to first blend metal powders together to achieve the precise mechanical properties desired. At room temperature, the metal powder is compressed and compacted into a desired shape. For instance, the metal powders can be placed in a mold and subjected to a multi-action press.

Once compressed and shaped, the housing is heated to a temperature sufficient for the metal particles to bond, but at a temperature insufficient to allow the metal to melt. If desired, the fused product can be repressed and heat treated.

As opposed to cast stainless steel housings, besides being less expensive, housings made from sintered stainless steel can be produced having a near-net shape design that requires minimal machining. As described above, cast stainless steel bearing housings typically must undergo at least four separate machining operations before being used in a bearing shown in FIG. 4, flange bearing assembly 70 includes an inner bore 74 for journalling a rotatable shaft. Bearing assembly 70 includes a bearing housing 76 made from sintered stainless steel. Bearing housing 76, in this embodiment, includes a pair of external flanges 78 and 80 defining corresponding holes 82 and 84 which are used when securing the bearing assembly to an adjacent structure.

Bearing assembly 70 further includes a bearing insert generally 86. Bearing insert 86 has a plurality of ball bearings, roller bearings or the like, interposed between an outer race 88 and an inner race 90. The external surface of outer race 88 seats in a circular bore in the internal wall of bearing housing 76, such as, for instance, in circular bore 54 as shown in FIG. 2.

As also illustrated in FIG. 2, circular bore 54 includes radial slots 56 and 58. Bearing insert 86 is positioned into circular bore 54 by being inserted through radial slots 56 and 58. Bearing insert 86 is then rotated on its transverse axis until the center axis is in alignment with the center axis of bearing housing 50. After being inserted into circular bore 54, bearing insert 86 can pivot sufficiently to permit the bearing insert to effectively align itself with any misalignment of a shaft that is placed in inner bore 74.

Figure 3:
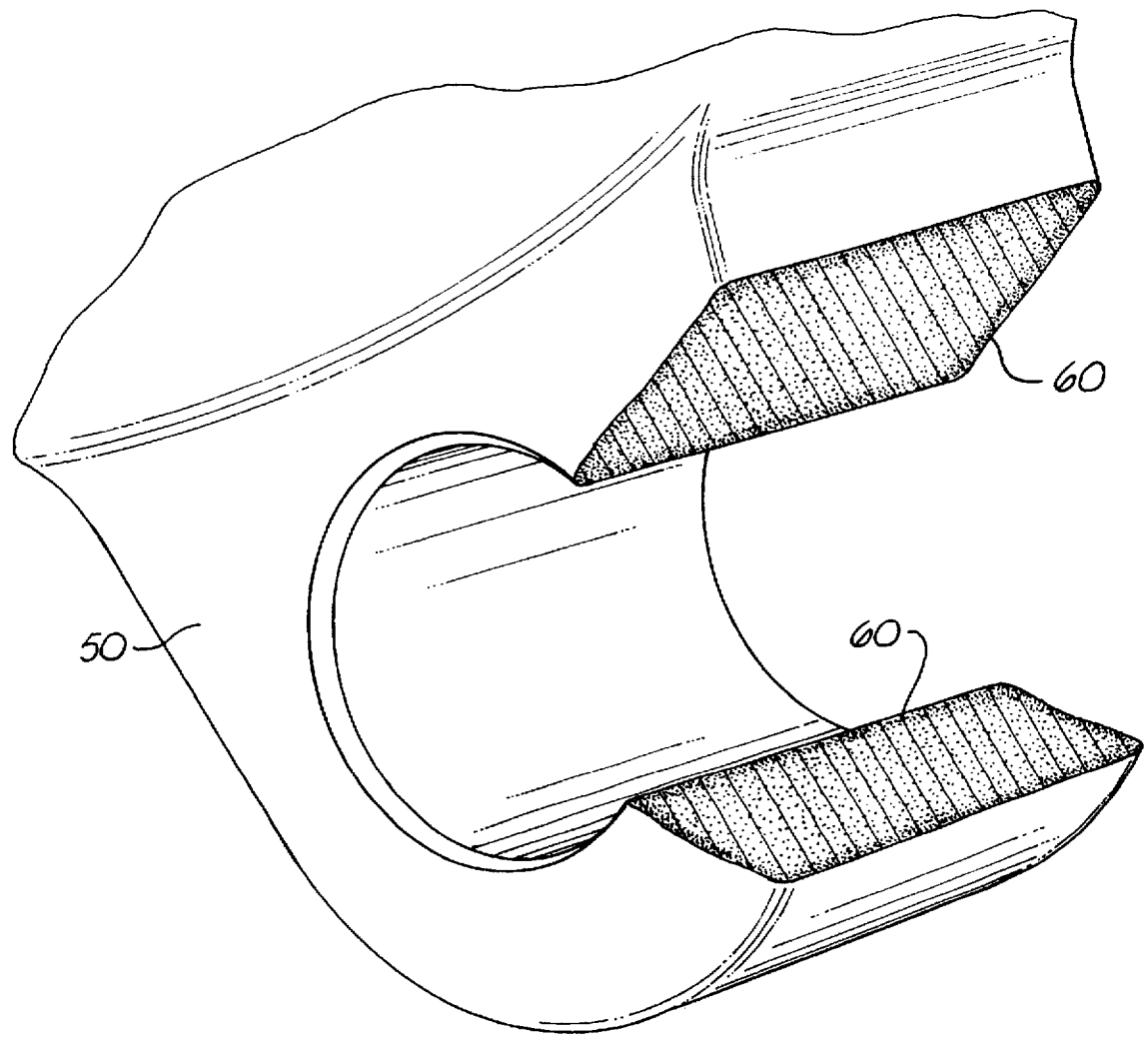
FIG. 3 is a perspective view with cutaway portions of the bearing housing shown in FIG. 2 illustrating that the metal housing has been impregnated with a polymer resin.

As described above, in accordance with the present invention, bearing housing 50 in FIG. 2 and bearing housing 76 in FIG. 4 are made with sintered stainless steel, making them well suited for use in wet and harsh chemical environments. As shown in FIG. 3, in one embodiment, bearing housing 50 can be impregnated with a polymeric material 60. Polymeric material 60 can be used to seal bearing housing 50 after formation. Specifically, during sintering of the metal powder to form bearing housing 50, pores can form in the housing. When the bearing assembly is placed in operation, these pores could entrap chemicals and bacteria in the operating environment, which could be detrimental to the processes taking place. Thus, in order to prevent any such problems from occurring, bearing housing 50 can be impregnated with a sealant, such as a polymeric material.

One particular sealant that has been found well suited for use in the present invention is RESINOL RTC Porosity Sealant marketed by The Loctite Corporation of Newington, Conn. RESINOL RTC Porosity Sealant is a low viscosity water washable sealant made from thermoset polymers. Specifically, the sealant includes a blend of methacrylate monomers that flow into the pores of bearing housing 50 and polymerize to form a polymer filler.

The process for impregnating a sintered stainless steel housing includes first evacuating the air from the pores located in the housing. The bearing housing is then repressurized while being immersed in the liquid polymeric material. The sealant flows into the evacuated pores and polymerizes to form a solid thermoset plastic. Any polymer left on the surface of the housing can then be easily removed by washing the bearing housing in water.

Besides protecting bearing housing 50 and sealing the surface of the housing, it has further been discovered that polymeric material 60 also serves to enhance the machining characteristics of the housing. Specifically, it has been discovered that after bearing housing 50 is impregnated and circular bore 54 is machined, the circular bore holds its size better and maintains a desired swivel torque better than housings that have not been impregnated with a sealant.

These and other modifications and variations of the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinarily skill in the art will appreciate that the foregoing description is by way of example only, and is not intended to limit the invention as further described in such appended claims.

What is claimed is:

1. A bearing assembly suitable for use in a wet or harsh chemical environment, said bearing assembly comprising:

an anti-corrosive bearing housing defining a circular bore therethrough, said circular bore having an inner curved surface, said bearing housing further including at least one mounting member for securing said housing to an adjacent structure;

a bearing insert received within said circular bore, said bearing insert defining an exterior surface for mating with said inner curved surface of said bearing housing, said bearing insert defining an inner bore for supporting a shaft; and wherein said bearing housing is made from a material comprising sintered stainless steel, said sintered stainless steel being resistant to corrosion and chemical attack.

2. A bearing assembly as defined in claim 1, wherein said sintered stainless steel is an austenitic grade.

3. A bearing assembly as defined in claim 1, wherein said sintered stainless steel is a martensitic grade.

4. A bearing assembly as defined in claim 1, wherein said sintered stainless steel is a stainless steel having an alloy designation number selected from the group consisting of 303, 304, 316, and 410.

5. A bearing assembly as defined in claim 1, wherein said sintered stainless steel comprises from about 11 percent to about 20 percent by weight chromium.

6. A bearing assembly as defined in claim 1, wherein said sintered stainless steel has an alloy designation number of 316.

7. A bearing assembly as defined in claim 1, wherein said bearing housing is impregnated with a polymeric material.

8. A bearing assembly as defined in claim 7, wherein said polymeric material comprises a thermoset polymer.

9. A bearing assembly as defined in claim 8, wherein said polymeric material comprises a blend of methacrylate monomers.

10. A bearing assembly suitable for use in a wet or harsh chemical environment, said bearing assembly comprising:

an anti-corrosive bearing housing defining a circular bore therethrough, said bearing housing including at least one mounting member for securing said housing to an adjacent structure, said bearing housing being made from a material comprising sintered stainless steel;

a bearing insert received within said circular bore, said bearing insert defining an inner bore for supporting a shaft; and a sealant, said bearing housing being impregnated with said sealant.

11. A bearing assembly as defined in claim 10, wherein said sealant comprises a thermoset polymer.

12. A bearing assembly as defined in claim 10, wherein said sealant comprises a blend of methacrylate monomers.

13. A bearing assembly as defined in claim 10, wherein said sintered stainless steel contains from about 11 percent to about 20 percent by weight chromium.

14. A bearing assembly as defined in claim 10, wherein said sintered stainless steel comprises a stainless steel having an alloy designation number of 316.

* * * * *